United States Patent [19]
Fife et al.
[11] 4,017,824
[45] Apr. 12, 1977

[54] ACCELERATION-INSENSITIVE HYDROPHONE

[75] Inventors: Merrill E. Fife, Canyon Country; James W. Pell, Jr., Northridge, both of Calif.

[73] Assignee: The Bendix Corporation, North Hollywood, Calif.

[22] Filed: June 6, 1975

[21] Appl. No.: 584,329

[52] U.S. Cl. .................................. 340/10; 310/8.4; 340/8 R

[51] Int. Cl.² .................................. H04B 13/00

[58] Field of Search .................. 340/8 R, 9, 10, 11, 340/12 R, 13 R; 310/8.4

[56] References Cited

UNITED STATES PATENTS

| | | | |
|---|---|---|---|
| 2,788,454 | 4/1957 | Zapponi | 340/10 X |
| 2,945,208 | 7/1960 | Samsel | 340/10 |
| 2,961,637 | 11/1960 | Camp | 340/10 |
| 3,025,359 | 3/1962 | Schilling et al. | 340/10 X |
| 3,187,300 | 6/1965 | Brate | 340/10 |
| 3,255,431 | 6/1966 | Howatt | 340/10 |
| 3,311,873 | 3/1967 | Schloss | 340/10 |
| 3,716,828 | 2/1973 | Massa | 340/10 |
| 3,832,762 | 9/1974 | Johnston | 340/10 |

*Primary Examiner*—Harold Tudor
*Attorney, Agent, or Firm*—Robert C. Smith; William F. Thornton

[57] ABSTRACT

A hydrophone configuration provides compensation for longitudinal accelerations by placing two essentially identical solid ceramic piezoelectric elements back-to-back against a centrally located bulkhead in a strong cylindrical metal housing. The opposite ends of the elements are bonded to end caps which are mechanically sealed to the inside walls of the housing. The inside walls are spaced from the elements to allow any radial expansion or contraction of the elements to take place into an air chamber which is effectively isolated from the input to the hydrophone which is axial against the outside surfaces of the end caps. In a second embodiment two pairs of parallel-connected piezoelectric elements are included for a higher capacitance.

10 Claims, 4 Drawing Figures

ACCELERATION-INSENSITIVE HYDROPHONE

BACKGROUND OF THE INVENTION

Towed arrays have been used for some time as listening devices for detecting the presence of underwater sound sources. Such arrays consist of a series of interconnected hydrophones with the requisite electronics encased in a flexible tubular jacket. These arrays may be manufactured in sections of any desired length, such as 50 or 100 feet, which may be connected end to end to produce a much longer array. Such arrays are then towed behind a ship, often at a substantial distance and at moderate speeds to minimize noise related to turbulence from the ship's wake and from velocity effects. So long as the array is being pulled through the water certain longitudinal acceleration and deceleration forces on the array are inevitable, and these forces tend to result in the production of spurious signals from the hydrophones.

Previous hydrophones for towed arrays have dealt with the problem of acceleration-induced spurious signals by placing pairs of hydrophones physically back-to-back to produce a structure in which longitudinal accelerations tend to shorten one element while elongating the other, thus canceling or substantially canceling the spurious acceleration-induced signals. Such hydrophones have typically used transducer elements in the form of hollow cylinders of ceramic piezoelectric material with both outside and inside surfaces exposed to oil and having an orifice or port to permit oil to flow from inside to outside or the reverse for hydrostatic pressure compensation. Such fragile elements, even if encased in oil, are subject to damage from rough handling on deck. It has also been found that the pressure-equalizing orifice introduces an undesirable phase shift into the output of the hydrophones—at least at some frequencies. There is also a problem with spurious signals resulting from transverse accelerations which apparently result from some flexing of the side walls of the element.

DESCRIPTION OF THE PREFERRED EMBODIMENT

Figure 1:
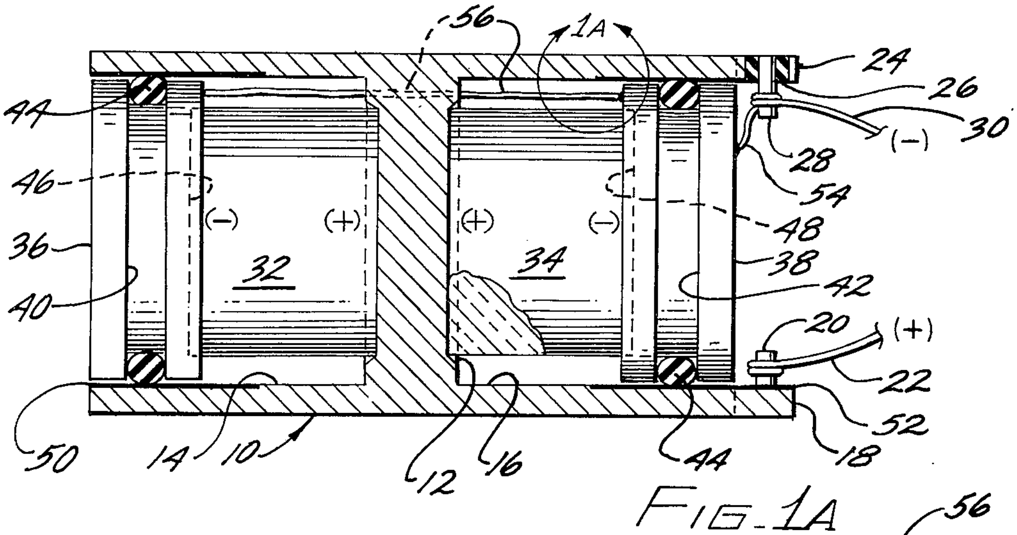
FIG. 1 is a plan view, partly in section, of one embodiment of hydrophone incorporating our invention.

Referring now to FIG. 1, a generally cylindrical housing 10 is shown having a centrally located bulkhead 12 which divides the housing into chambers 14 and 16. At the one end of housing 10 is a first lug 18 which supports an electrical binding post 20 to which is attached a wire 22 carrying one side of the hydrophone output. Also connected to housing 10 is a lug 24 having an insert 26 of insulating material and an electrical binding post 28 and a wire 30 carrying the other side of the hydrophone output signals. These two "sides" are conventionally distinguished by means of plus and minus symbols, although those skilled in the art will appreciate that each side may be either positive or negative relative to ground potential at different instants of time. Carried within the housing 10 and physically and electrically bonded to the bulkhead 12 are a pair of essentially identical piezoelectric transducer elements 32 and 34 which may be of a piezoelectric ceramic material.

Bonded to the outside ends of ceramic elements 32 and 34 are a pair of cylindrical metal end cap members 36 and 38 including annular circumferential grooves 40 and 42, respectively. Positioned in groove 40 in such a way as to provide a firm liquid-tight seal against the inside wall of chamber 14 is an O-ring 44, and an O-ring 46 is similarly positioned in groove 42. It will be observed that the inside faces of each of end caps 36 and 38 has a circular hollow indentation 46 and 48, respectively, dimensioned to contain the ends of the ceramic elements 32 and 34, respectively. Similar indentations have been formed on each side of the bulkhead 12 for the purpose of retaining the opposite ends of the ceramic elements 32 and 34, and these indentations are tapered as an aid in guiding the ceramic elements 32 and 34 into the desired concentric position relative to the housing 10.

Housing 10 is typically of aluminum, and since it is desired that this housing be electrically insulated from the end cap members 36 and 38, annular areas 50 and 52 are anodized to provide such insulation. It could also be of other metals such as steel or even of a nonconductor such as plastic with the necessary conducting tracks if the side walls can be made sufficiently heavy to avoid excess deformation under the ambient pressure.

It will be appreciated that, with the electrical connections shown, the connection to post 20 results in having the entire housing 10 along with the inside faces of the transducer members 32 and 34 connected to one side of the output voltage (+). The wire 30 connected to binding post 28 is also connected to a small wire 54 bonded to the face of end cap 38, thereby placing end cap 38 at the opposite side of the output voltage (−). This lead 54 should be made as short and light as practicable, since any significant weight of wire attached to end cap 38 results in the introduction of noise into the output of the hydrophone. A small wire 56 is connected to the inside face of end cap 38, through a passageway in bulkhead 12 from which it is insulated, and to the inside face of end cap 36 thereby also placing this end cap at the same electric potential as end cap 38. The outside ends of ceramic elements 32 and 34 are both mechanically and electrically bonded to the end caps 36 and 38, respectively, and thus these surfaces of the ceramic elements are also at the same electric potential as end caps 36 and 38.

Figure 1A:
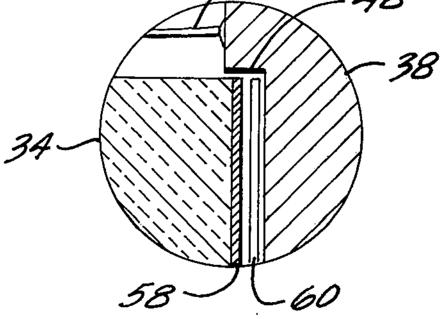
FIG. 1A is an enlarged view of a portion of the hydrophone of FIG. 1.

Details of the connection between the transducer element 34 and the end cap 39 are shown in detail in FIG. 1A. In this enlarged figure, some of the clearances are exaggerated to show detail of the structure. The end of the ceramic member 34, which is silvered in order to aid conduction as shown at numeral 58, is positioned within the indentation of depression 48 in end cap 38. Placed between the silvered face of the ceramic member 34 and the surface of end cap 38 is a layer of adhesive which is in the form of a thin fabric or paper disc saturated with an electrically conducting epoxy cement. Thus, it will be seen that the outside end of the ceramic member 34 is mechanically supported in the depression 48 in end cap 38 and is bonded thereto through a conductive bond such that the electric potential of the outside face of ceramic member 34 is the same as that of the end cap 38. The construction on the outside end of ceramic member 32 is identical. As will be understood by those skilled in the art, acoustic signals in the surrounding water result in pressure changes which will tend to compress or shorten, and then lengthen, elements 32 or 34 together, causing an alternating electrical signal to be generated which appears as an output signal on wires 22 and 30. Any undesired longitudinal accelerations will tend to shorten one element while lengthening the other, and these changes tend to produce canceling electrical signals.

Figure 2:
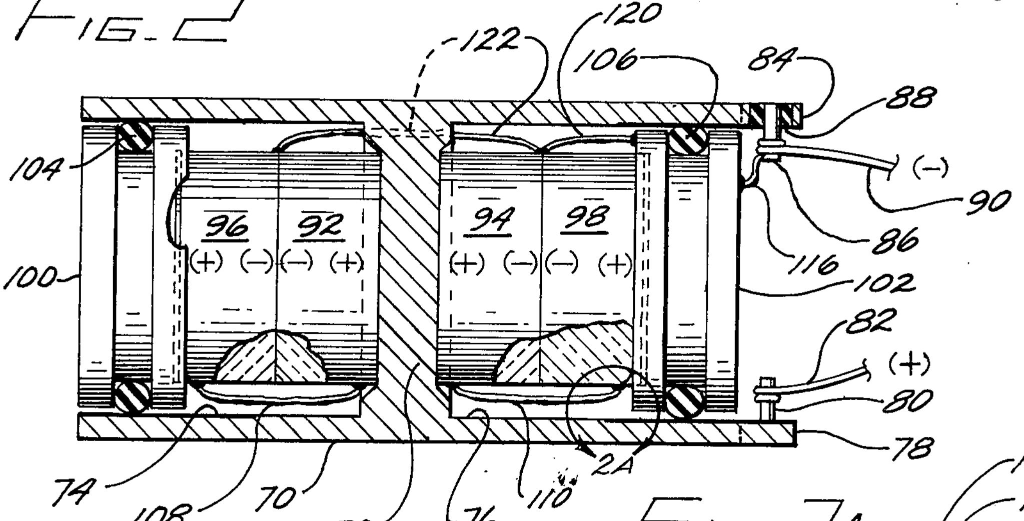
FIG. 2 is a plan view, partly in section, of another embodiment of hydrophone incorporating our invention.
Figure 2A:
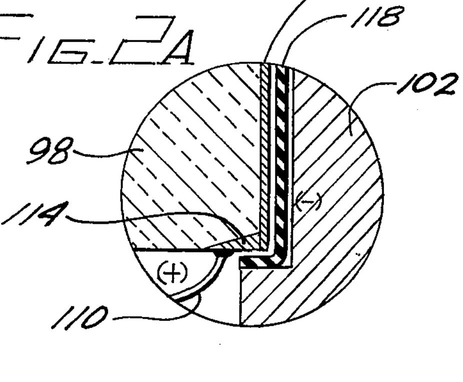
FIG. 2A is an enlarged view of a portion of the hydrophone of FIG. 2.

A second embodiment of our invention is shown in FIGS. 2 and 2A and includes a cylindrical metal housing 70 having an internal bulkhead 72. This construction is very similar to that shown in FIGS. 1 and 1A with certain changes in the configuration of the piezoelectric elements and the connections thereto, as will be described hereafter. Housing 70 is divided into two chambers 74 and 76 and includes a first lug 78 supporting a binding post 80 supporting a wire 82 which is one terminal of the output signal and for convenience is designated as the positive (+) terminal. Similarly a second lug 84 carries a second binding post 86 insulated therefrom by means of an insulating grommet 88. Post 86 supports a wire 90 connected to a source which is the other terminal of the output signal and for convenience is designated as the negative (−) terminal. Bonded to the opposite side of bulkhead 72 are piezoelectric elements 92 and 94, and these are also electrically connected to said bulkhead such that they are at the same electric potential as the (+) terminal of the output signal as is all of housing 70. Each of chambers 74 and 76 contains a second piezoelectric element 96 and 98, respectively, and the adjacent elements are bonded to each other through a cement and wire mesh bond such that they are electrically connected and their adjoining faces have the same piezoelectric polarity. At the outside ends of elements 96 and 98 are end cap members 100 and 102 which are bonded to these elements as described below. End cap members 100 amd 102 each contain an annular circumferential groove containing an O-ring 104 and 106, respectively.

As previously indicated, the connection to binding post 80 results in the housing 70 including the bulkhead 72 and the inside surfaces of ceramic elements 92 and 94 being at the same electric potential. These surfaces are also connected through wires 108 and 110 to the outside of elements 96 and 98, respectively. The details of the connection between the outside face of element 98 and the end cap 102 are shown in greater detail in FIG. 2A in which it will be observed that element 98 has a silver layer 112 on its outside surface, and this silver layer is continued in a projection 114 for a short distance along its side. Wire 110 is soldered to projection 114, and since wire 110 is connected to the inside surfaces of elements 92 and 94, the silver layer 112 at the outside end of element 98 is also at the same potential as that of the (+) terminal of output signal. Since the end cap 102 is connected through a light wire 116 to the binding post 86 potential, end cap 102 is at the opposite side of the output signal from the housing and is insulated from the element 98 by means of a layer of paper or fabric which is saturated with a nonconducting epoxy as shown at numeral 118. Since the end cap 102 is on the opposite side of the output signal from the face of element 98, it might appear that the adjoining face of end cap 102 could be anodized to provide the desired insulating layer. Such anodizing has been helpful but was insufficient in thickness to avoid adding a substantial undesirable capitance. Applicants found that this capacitance was greatly reduced by using the insulating member 118 which increased the spacing between element 98 and end cap 102. End cap 102 is connected through a first wire 120 to the junction at the adjoining faces of elements 94 and 98 and a second insulated wire 122 which passes through the bulkhead 72 to the junction at the adjoining faces of elements 92 and 96. Thus, the embodiment shown in FIGS. 2 and 2A incorporates two pairs of ceramic elements effectively connected in parallel for a larger capacitance as compared with the version of FIGS. 1 and 1A to decrease the phase shift between the output electrical signal and the input acoustic signal. Again, it is necessary that the housing 72 be electrically insulated from the end caps 100 and 102, and the manner in which this is done may vary depending upon the application for the hydrophone and the material used. If the housing 72 is made of aluminum, the inner surfaces of chambers 74 and 76 may be anodized as described above. Should it be necessary to use a steel housing because of operation at extreme depths, then the annular surfaces of end caps 100 and 102 may be anodized to provide the desired insulation. It will be recognized that the clearance shown between these members have been exaggerated for clarity and that these members normally will be fairly closely fitted together. The hydrophones shown in the drawings would normally be contained within an elongated flexible housing filled with oil such that the oil is exposed to the ambient pressure in the ocean. This pressure must be withstood both by the housing and by the seals since the interiors of chambers 14 and 16 in FIG. 1 and chambers 74 and 76 in FIG. 2 contain air at approximately sea level pressure to permit relatively unresticted radial movement of the ceramic elements into air.

Thus, the hydrophone constructions which we have devised meet and overcome many of the problems of the prior art and provide certain additional advantages. Although compensating for longitudinal accelerations, they may be made very small and are very resistant to rough handling because of the rugged housings and the solid ceramic elements used. The back-to-back elements need to be as close to identical as practicable, and these elements can be cut from rods of solid ceramic material of uniform cross-section. This makes it much easier to produce such essentially identical elements than where the hollow elements are used. The ruggedness of the hydrophones makes it possible to avoid hollow elements and the pressure compensation technique requiring an orifice which introduces the phase shift problems mentioned above. Applicants have had some indication that the solid elements are less susceptible than the hollow elements to introducing spurious signals from transverse accelerations.

Those skilled in the art will recognize that certain modifications may be effected without departing from the teachings of our invention. The electrical connections shown may obviously be reversed or modified with appropriate relocating of insulating layers. While posts 28 and 86 are shown in a collar of insulating material, these posts could also be made of nonconducting material. As indicated above, the housings could be of any electrically conductive structural material or even of non-conducting plastic with the requisite conduction tracks, depending upon whether the pressures experienced require a stronger side wall. While the particular sealing technique used is normally satisfactory, more elaborate seals such as those with a back-up ring may be used where required. Those skilled in the art will be aware of the need to control the length or thickness of such insulating barriers as layer 118 to control capacity values as needed.

We claim:

1. A hydrophone for providing electrical output signals in response to sensed acoustic signals comprising a hollow housing having substantial strength and a central bulkhead dividing said housing into two chambers, a piezoelectric element of solid ceramic material abutting against and connected to each side of said bulkhead and spaced from the walls of said chambers, electrically conducting end cap members mechanically sealed to the outer ends of said piezoelectric elements, means electrically insulating said end caps from the walls of said chambers, sealing means providing a liquid-tight seal between said chamber walls and said end caps, first electrical connections providing output potentials of a first polarity connected to said housing, said bulkhead and adjacent end surfaces of said piezoelectric elements; and second electrical connections providing output potentials of a second polarity connected to at least one of said end caps and the opposite end surfaces of said piezoelectric elements.

2. A hydrophone as set forth in claim 1 wherein said end cap members are electrically connected to the adjacent surfaces of said piezoelectric elements.

3. A hydrophone as set forth in claim 1 wherein said bulkhead includes a passage thereacross and part of said second electrical connections are connected through and insulated from said bulkhead.

4. A hydrophone as set forth in claim 1 wherein said second electrical connections include a terminal fastened to said housing and insulated therefrom and a light and short wire connected from said terminal to the face of the adjacent end cap.

5. A hydrophone as set forth in claim 1 wherein said sealing means includes grooves on the surfaces of said end caps adjacent said chamber walls and O-rings in said grooves.

6. A hydrophone as set forth in claim 1 wherein said end cap members are electrically insulated from the adjacent surfaces of said piezoelectric elements.

7. A hydrophone as set forth in claim 6 wherein said piezoelectric elements each comprise two separate solid blocks of ceramic material on each side of said bulkhead, the adjoining surfaces of each pair of said blocks being electrically connected to said second electrical connections and the opposite surfaces of each pair of said blocks being connected to said first electric connections.

8. A hydrophone for providing electrical output signals in response to sensed acoustic signals comprising a hollow cylindrical metal housing of substantial strength, said housing having a generally centrally located bulkhead dividing said housing into two chambers, first and second generally cylindrical blocks of piezoelectric material bonded to opposite sides of said bulkhead and electrically connected thereto and spaced from the walls of said chambers, first and second generally cylindrical end cap members mechanically bonded to the opposite ends of said blocks of piezoelectric material and resilient sealing means forming a liquid-tight seal between the walls of said chambers and said end cap members, means electrically insulating the walls of said chambers from said end cap members, first electrical connections providing a first polarity of said output signal connected to said housing including said bulkhead and the adjacent surface of said piezoelectric material, and second electrical connections providing the other polarity of said output signal connected to at least one of said end caps and the opposite end surfaces of said blocks of piezoelectric material.

9. A hydrophone as set forth in claim 8 wherein said end cap members are electrically insulated from the adjacent surfaces of said piezoelectric elements.

10. A hydrophone as set forth in claim 9 wherein said piezoelectric elements each comprise two separate solid blocks of ceramic material on each side of said bulkhead, the adjoining surface of each pair of said blocks being electrically connected to said second electrical connections and the opposite surfaces of each pair of said blocks being connected to said first electrical connections.

* * * * *